United States Patent [19]

Page

[11] 3,970,417
[45] July 20, 1976

[54] TWIN TRIPLE CHAMBERED GAS DISTRIBUTION SYSTEM FOR MELT BLOWN MICROFIBER PRODUCTION

[75] Inventor: Robert E. Page, Davis, Ill.

[73] Assignee: Beloit Corporation, Beloit, Wis.

[22] Filed: Apr. 24, 1974

[21] Appl. No.: 463,461

[52] U.S. Cl. .............................. 425/72 S; 239/422; 239/553.3
[51] Int. Cl.² ......................................... B29D 7/20
[58] Field of Search .............. 239/75, 76, 290, 296, 239/299, 418, 422, 426, 543, 544, 553.3, 568, 549, 597, 135, 553.5, 13; 425/7, 72, 72 S; 264/12

[56] References Cited
UNITED STATES PATENTS

| | | | |
|---|---|---|---|
| 3,379,811 | 4/1968 | Hartmann et al. ................ | 425/72 X |
| 3,531,053 | 9/1970 | Miller et al. ..................... | 239/553.3 |
| 3,715,183 | 2/1973 | Manifold ......................... | 239/553.3 |
| 3,744,724 | 7/1973 | Caille ............................. | 239/553.5 |
| 3,825,379 | 7/1974 | Lohkamp et al. ................. | 425/72 |

Primary Examiner—John J. Love
Attorney, Agent, or Firm—Hill, Gross, Simpson, Van Santen, Steadman, Chiara & Simpson

[57] ABSTRACT

Forming system for generating from heated, pressurized gas a pair of flattened, angularly colliding gas streams, each stream being adapted to be on a different opposed side of a die head producing a plurality of generally aligned, spaced, hot melt strands of polymeric material or the like. The system employs a pair of sequential plenum chambers on each such opposed side with a distribution conduit optionally being in the first plenum chamber of each such pair. Heated, pressurized gas enters into each such first plenum chamber, and then passes into the associated second such plenum chamber of each such respective plenum chamber pair through orifices so sized that a pressure drop occurs in each such second plenum chamber. Gas escapes through a nozzle portion associated with each second plenum chamber to produce the desired colliding gas streams. Each such stream is substantially uniform and is identical to the other in dimensions as well as other physical characteristics.

9 Claims, 19 Drawing Figures

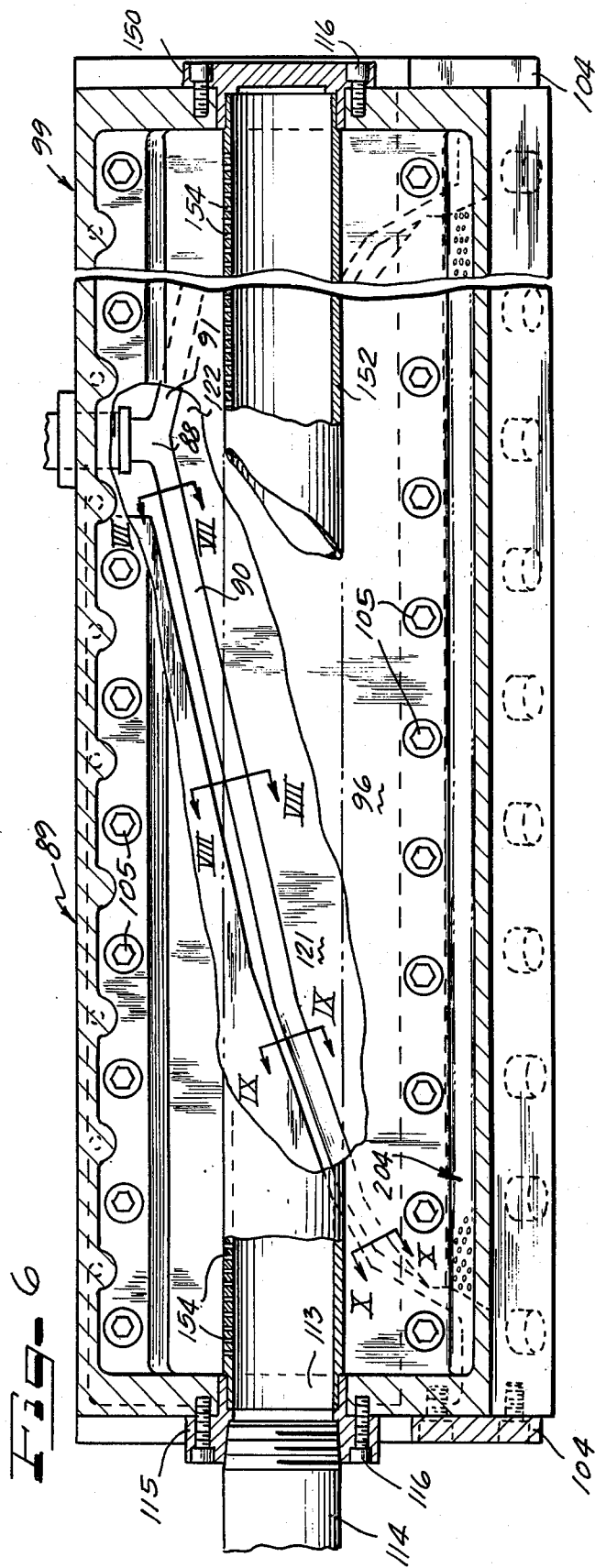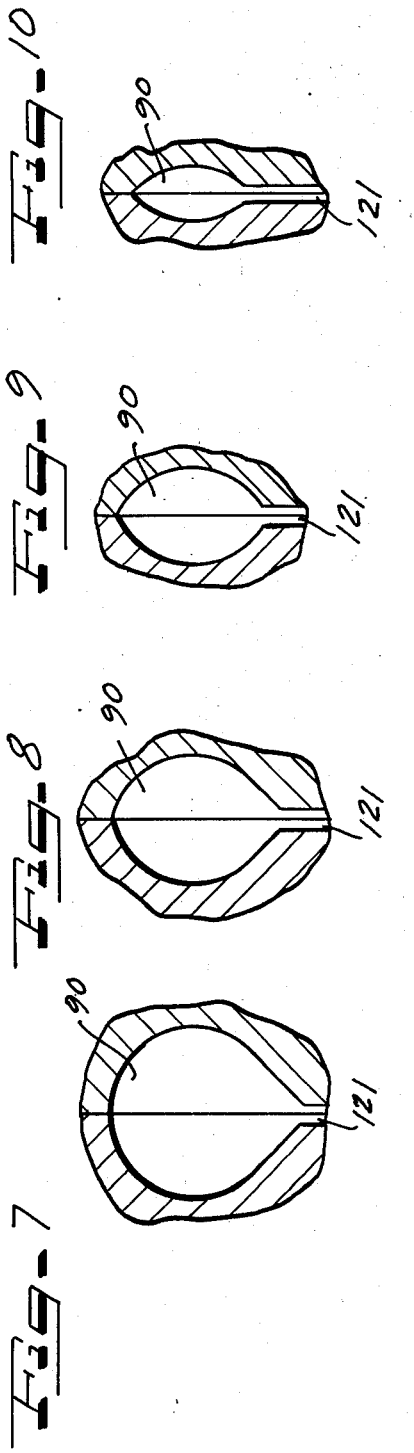

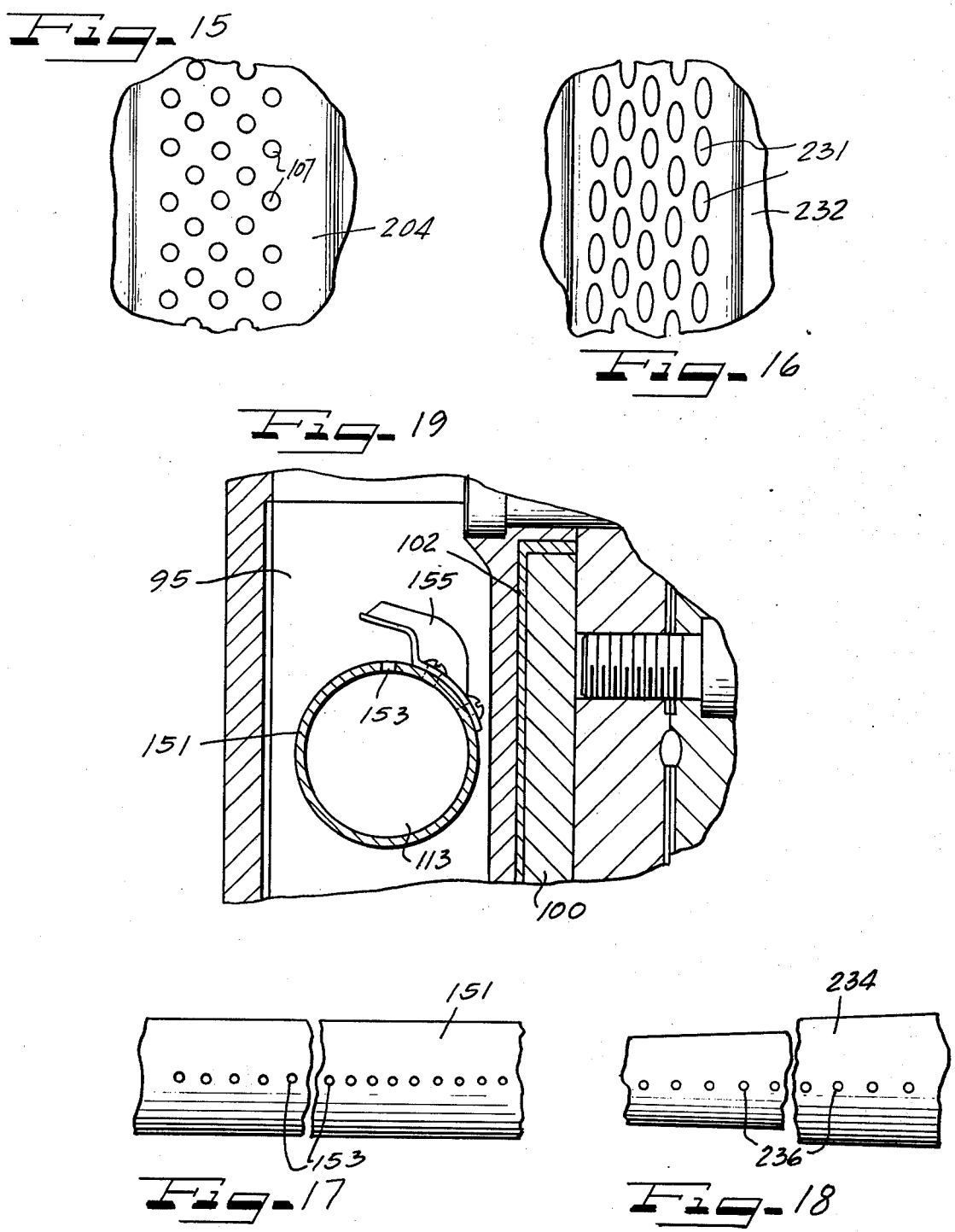

TWIN TRIPLE CHAMBERED GAS DISTRIBUTION SYSTEM FOR MELT BLOWN MICROFIBER PRODUCTION

BACKGROUND OF THE INVENTION

In the art of producing melt-blown microfibers, a plurality of spaced, aligned hot melt strands of polymeric material, or the like, are extruded downwardly simultaneously directly into the elongated zone of confluence formed by a pair of heated, pressurized, angularly colliding gas (usually air) streams, each stream typically being in a flat, sheet-like configuration and being on a different, opposed side of such strand plurality. The gas streams break up the strands into fine, filamentous structures, and move such forwardly, so that a non-woven web thereof is continuously laid down upon a moving surface. The U.S. Naval Research Laboratory, Washington, D.C. and Esso Research and Engineering Company, Baytown, Texas, have heretofore reported research and development work on such process.

In the process, it is believed desirable to have the two flattened gas streams employed be not only as nearly identical to each other as practical (as respects such variables as stream dimensions, gas composition, gas temperature, gas pressure, gas volume, stream angle with respect to the forward direction in which the strand plurality is being extruded, eddy currents, and the like), but also as uniform as possible. Thus, with respect to an individual one of such pair of streams, it is very desirable to control and maintain uniformly such variables. Each gas stream has a temperature about equal to that of the temperature of the strands in one presently preferred mode of practice.

In prior art apparatus used for the practice of this process, a pipe was located along each side of a die head adapted to extrude such strand plurality, and an elongated, slotted orifice in each pipe permitted air to escape therefrom and pass against each opposed side of such strand plurality. To supply heated air to each one of such pipes, a plurality of conduits in adjacent spaced relationship to each other joined the outside upper side wall of each such pipe; this arrangement was sometimes nick-named by those skilled in the art "the pipe organ". Unfortunately, this arrangement is not particularly easy or economical to construct or even to maintain. In addition, this arrangement characteristically produces a non-uniform temperature gradient along the mouth of each slotted orifice, causing a patterned variation of "hot" and "cold" spots therealong, these gradient differences being so great as to commonly cause a "striped" effect to appear in a non-woven web of melt blown microfibers produced with such arrangement. Such strips indicate sheet thickness variations transversely along the path of web generation, and these thickness variations in turn are believed to be caused by temperature and perhaps even pressure variations in air stream uniformity along individual stream longitudinal width. Precise, accurate, stable, uniform individual gas streams are difficult, and probably impossible, to achieve with such prior art apparatus.

Recently, an improved system for generation of such flattened, angularly colliding gas streams was discovered in which a pair of plenum chambers serving as expansion zones were used in place of the pipe organ arrangement. However, although the idea of using a pair of such plenum chambers has been very promising as a technique for producing the desired gas stream with substantially uniform characteristics, a difficulty has been encountered with such plenum chambers which has presented a very serious problem requiring solution.

This problem has been the fact that, in operation, the greatly elongated, rectangularly shaped slotted orifice region associated with each one of such plenum chamber pairs displays a strong tendency to change its dimensions at operating conditions compared to its dimensions at ambient, non-operating conditions (where slot dimensions are conveniently preset as desired). Such change is caused by the expansion characteristics of plenum chambers (and associated apparatus) since such enlarge in response to the heated, pressurized gas flowing therethrough. The characteristic thermal expansion pattern thus produced in orifice (or nozzle) regions during operation has been tentatively termed "the banana effect" because each orifice tends to enlarge its width in its mid-section relative to the opposite ends thereof. Such an enlargement changes the orifice dimensions sufficiently to alter undesirably gas stream characteristics issuing therefrom. Thus, such alteration is sufficient to adversely affect properties of melt blown microfibers and webs made therefrom, particularly under certain operating conditions, even though such actual expansion is less than about 1/1000 inch. Such a mid-section expansion causes a gas stream which would otherwise issue from such a slotted orifice region to undergo drops in pressure, tempressure and velocity, among other effects. Such expansion thus makes the attainment of stable, uniform operating conditions and product gas streams very difficult potentially to obtain.

BRIEF SUMMARY OT THE INVENTION

There has now been discovered an improved apparatus and associated process which uses the idea of a pair of plenum chambers (as described above), but which overcomes the above indicated problem associated therewith, so that there is presently provided a system for generating a pair of gas streams, each of which has an elongated, generally rectangular configuration, and each of which is adapted to have substantially identical dimensions. These streams are typically arranged so as to collide with one another angularly as is desired in the known process for making melt-blown microfibers, as indicated above. In operation, all parts of the system are fixed relative to one another, and gas streams pairs so produced therewith are adapted to have substantially uniform, identical properties relative to one another, with each gas stream being locatable on a different side of a plurality of generally aligned, spaced, hot melt strands of polymeric material or the like, as are characteristically employed in the manufacture of melt blown microfibers and non-woven webs thereof.

Each product gas stream of the pair is produced through the use of its own pair of elongated sequential plenum chambers, one such elongated chamber pair being adapted to be on each opposed side of such strand plurality. Thus a heated, pressurized entering gas stream is fed into a first plenum chamber of each such pair under conditions such that such entering gas experiences a pressure drop upon entering such first plenum chamber as a result of which gas characteristics (such as temperature, pressure, etc.) can tend to equalize. Each such stream then exists from such first plenum chamber into a second plenum chamber of such pair under conditions such that such gas experiences another pressure drop upon entering such second plenum chamber as a result of which gas characteristics can tend to further equalize. Finally, such gas exits from an elongated orifice slot (or nozzle region) in each such second plenum chamber as a product gas stream adapted to be substantially uniform in characteristics and dimensions and further adapted to be directed against one side of a row of strands being generated. The other gas stream of such pair is similarly generated and is adapted to be directed against the other side of such strand row, equal but opposed stream angles presently being preferred.

The interrelationship between each such pair of sequential plenum chambers is such that, in the region where a gas stream moves from the first into the second plenum chamber, the gas stream passes through a plurality of orifices, the individual orifices being so arranged that a generally uniform pattern of air flow transversely with respect to the direction of air flow can take place. At the same time, the structural member wherein such orifices are defined interlocks the walls of the first plenum chamber with the walls of the second plenum chamber. The position of such structural member relative to the elongated orifice of the second plenum chamber is such that, in cooperation with the walls of the second plenum chamber, expansion movement of such orifice in a width-wise direction during operation of the system of this invention is substantially prevented, thereby overcoming the so-called banana effect above referenced.

Optionally, but preferably, each of the respective first plenum chambers is provided with its own separate distribution conduit. Heated, pressurized entering gas is thus maybe fed by a single tube to each such distribution conduit, and such gas then flown through orifice means each distribution conduit into each respective first plenum chamber as a result of which gas characteristics (such as temperature and pressure) can tend to equalize. Each stream then exits from such first plenum chamber to its associated second plenum chamber as just described.

It is an object of this invention to provide a system for achieving improved gas stream uniformity in a gas stream supply system for a melt blown microfiber production system.

Another object of this invention is to provide a system for gas generation by which one may avoid the use of the prior art pipe organ arrangement.

Another object is to achieve a system for producing a gas stream supply for melt blown microfibers which avoids the temperature and even pressure variations of prior art systems and which is suitable for the production of substantially uniform pairs of gas streams for such a gas stream supply.

Another object of this invention is to produce a gas stream supply system for melt blown microfibers which uses a twin triple chamber arrangement with three sequential chambers being used for each individual one of the gas stream pair generated by such supply system in at least two chambers of which gas expansion occurs.

Another object of this invention is to provide s system which one may avoid the so-called banana effect.

Another object of this invention is to provide an improved means for achieving substantially uniform gas distribution in a plenum chamber arrangement used in a gas stream supply system for melt blown microfibers which is also simultaneously adapted to prevent changes in stream terminal orifice dimensions during gas stream generating system operation.

Another object of this invention is to provide an improved process and an improved apparatus for a system of the type indicated which is economical to fabricate and maintain, adapted to be stable in operation, and simple to use and maintain.

Other and further objects, aims, purposes, advantages, utilizes, and features will be apparent to those skilled in the art from a reading of the present specification and drawings.

BRIEF DESCRIPTION OF THE DRAWINGS

In the drawings:

FIG. 3 is an end elevational view of one embodiment of apparatus of the present invention, some parts thereof broken away and some parts thereof shown in section;

FIG. 4 is a fragmentary vertical sectional view taken along the line IV—IV of FIG. 3;

FIG. 6 is a longitudinal sectional view taken along the line VI—VI of FIG. 5, some parts thereof broken away and some parts thereof shown in section, with special emphasis being given to illustrating the melt distributing system employed in the die body shown in the embodiment of FIG. 5;

FIG. 7 is an enlarged, fragmentary, detail view taken along the line VII—VII of FIG. 6;

FIG. 8 is an enlarged, fragmentary, detail view taken along the line VIII—VIII of FIG. 6;

FIG. 9 is an enlarged, fragmentary, detail view taken along the line IX—IX of FIG. 6;

FIG. 10 is an enlarged, fragmentary, detail view taken along the line X—X of FIG. 6;

FIG. 15 is an enlarged, fragmentary plan view taken along the line XV—XV of FIG. 5;

FIG. 16 is a view similar to FIG. 15 but showing an alternative embodiment;

FIG. 17 is an enlarged, fragmentary plan view taken along the line XVII—XVII of FIG. 5;

FIG. 18 is a view similar to FIG. 17 but showing an alternative embodiment; and

FIG. 19 is an enlarged, fragmentary vertical sectional view through the region of the left distributor conduit in FIG. 5, but showing an alternative embodiment.

DETAILED DESCRIPTION

Figure 1:
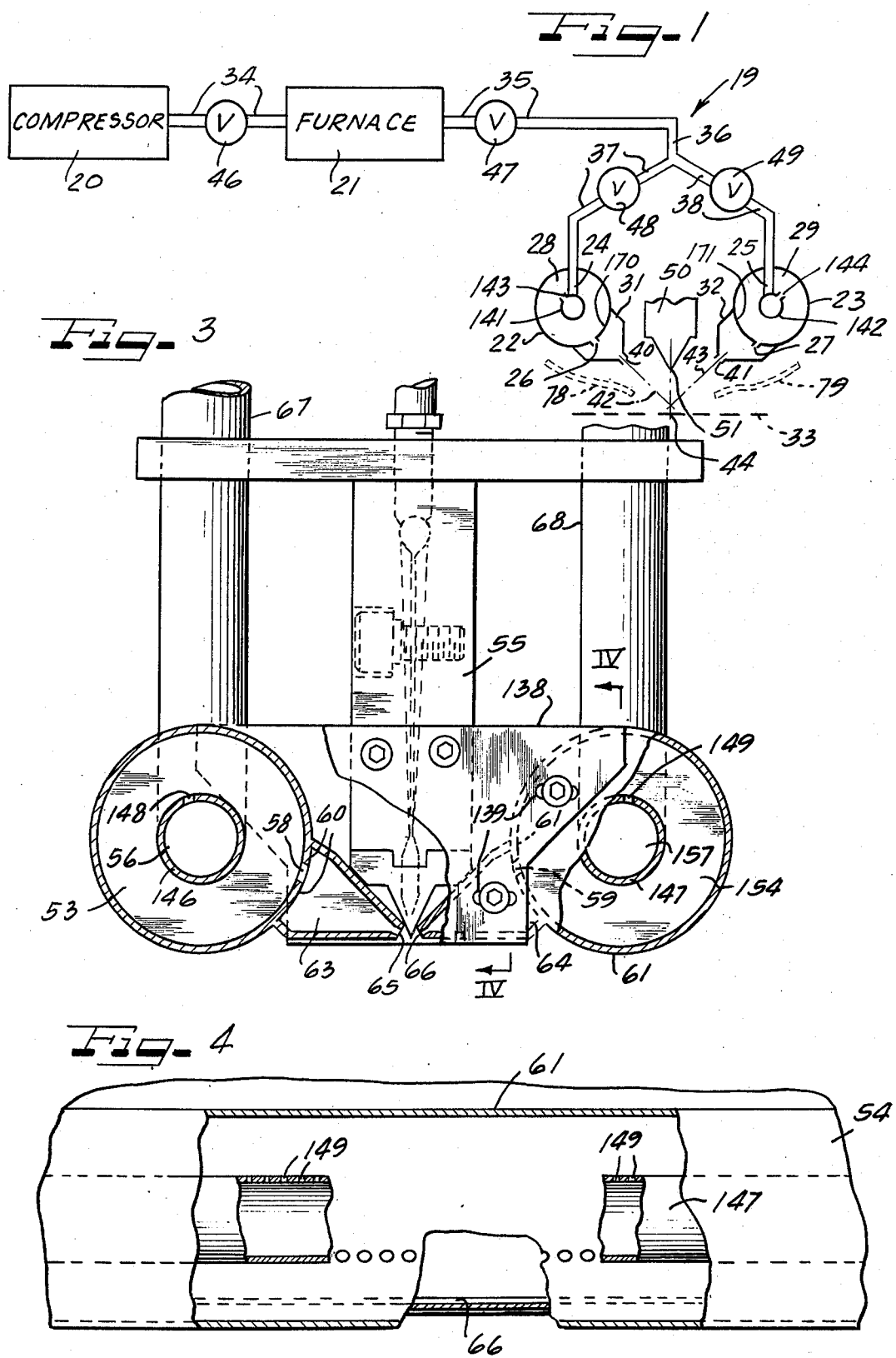
FIG. 1 is a schematic representation of one embodiment of operative principles of the present invention.

Referring to FIG. 1, there is seen a schematic diagram illustrating an embodiment of a typical gas stream generating apparatus of the present invention, such herein being designated in its entirety by the numeral 19. Apparatus 19 employs a means adapted to emit continuously a compressed gas of predetermined pressure, such as a conventional compressor 20. Output from the compressor 20 is fed through a tube 34 to a heating means adapted to heat the compressed gas to a predetermined temperature, such as a conventional furnace 21. If desired, the furnace can precede the compressor.

A pair of elongated first plenum housings 22 and 23 are provided in spaced, preferably generally parallel, relationship to each other. Each such plenum housing 22 and 23 has an input port 24 and 25, respectively, defined therein (here shown in the opposite end walls of each such housing 22 and 23, though other locations may be chosen), and a plurality of longitudinally extending output ports 26 and 27, respectively, defined in the respective side walls 28 and 29 thereof. The shape and location of such output port pluralities 26 and 27 is preferably such that a pressurized gas entering such respective port pluralities 26 and 27 from plenum housings 22 and 23 is emitted therefrom generally uniformly and generally continuously along the length thereof in the interior of each plenum housing 22 and 23.

Extending longitudinally through the interior of each plenum housing 22 and 23, in generally spaced relationship to the inside walls thereof, from the respective input pots 24 and 25 to the opposite end wall of each plenum housing 22 and 23, is a distributor conduit 141 and 142, respectively. Distribution conduits 141 and 142 constitute an optional but preferred means for inclusion into the apparatus 19, as those skilled in the art will appreciate. Each such conduit 141 and 142 is open at the end thereof joining each input port 24 and 25, but is in generally sealed engagement therewith; the opposite end of each such conduit 141 and 142 is sealed. Each respective such conduit 141 and 142 has a plurality of apertures 143 and 144, respectively, defined in side wall portions. The shape and location of such aperture means in each conduit 141 and 142, as well as the cross-sectional configuration of each such conduit 141 and 142, is such that a pressurized gas fed into each input port 24 and 25, respectively, is emitted from each conduit 141 and 142 generally uniformly and generally continuously along the length thereof in the interior of each respective plenum housing 22 and 23. Thus, an aperture 143 or 144 may be a single, elongated slot, a plurality of perforations (cross-sectionally round, elliptical, etc.), or the like, while a conduit 141 or 142 may be tapered longitudinally, or have a non-circular section, or may be against one interior wall of a plenum chamber, or the like, as those skilled in the art will appreciate. Preferably the apertures 143 and 144 are axially aligned, as suggested in FIG. 1 in one wall of the conduits 141 and 142, respectively.

A tube 35 from the furnace 21 interconnects at a tube Y-joint 36 with a pair of tubes 37 and 38, each of which, in turn, interconnects with input ports 24 and 25, respectively. If desired, input ports 24 and 25 may be constricted in cross-sectional area relative to the cross-sectional area of the respective tubes 37 and 38.

A pair of elongated second plenum housings 31 or 32 are provided. Each such plenum housing 31 and 32 is optionally but preferably cross-sectionally funnel shaped, as shown, and has a width which is longitudinally elongated. The mouth portion or beginning end of each plenum housing 31 or 32 joins in sealing engagement the adjacent side walls 28 and 29 of plenum housings 22 and 23, respectively. Each plenum housing 31 and 32 thus has a longitudinally elongated chamber portion therein in the region thereof about the respective output port pluralities 26 and 27, respectively. Each plenum housing 31 and 32 further has defined therein an elongated aperture or slotted nozzle portion 40 and 41, respectively. The nozzle portions 40 and 41 are preferably in a portion of housings 31 and 32 which is remote from port pluralities 26 and 27, respectively; for example, when plenum housings 31 and 32 are funnel shaped, such port pluralities 26 and 27 are in the mouth portions thereof, respectively, while the nozzle portions 40 and 41 are in the neck potions thereof, respectively. Such nozzle portions 40 and 41 are in generally spaced, generally parallel, generally symmetrical relationship to each other, so that, cross-sectionally, the angle of inclination of opposed respective center portions 42 and 43 of each one of said nozzle portions 40 and 41 can range from between about 0° to 90°, with preferred such angles of inclination ranging from about 15 to 45°, with respect to the center 44 between such nozzle portions 40 and 41.

The relationship in apparatus 19 between said compressor 20, said furnace 21, said distribution conduits 141 and 142, said plenum housings 22 and 23, said tubes 34, 35, 36, 37 and 38 and said ducts 31 and 32 is such that heated, pressurized gas entering said plenum housings 22 and 23 from said distribution conduits 141 and 142 and expands in said plenum housings 22 and 23. If no distribution conduits 141 and 142 are employed, such heated, pressurized gas is also caused to expand in first plenum housings 22 and 23 after passing the region of input ports 24 and 25 directly thereinto. Observe that a plurality of input ports 24 and of ports 25, respectively, may be used if no distribution conduits 141 and 142 are employed. This relationship further is such that, after passing through respective port pluralities 26 and 27, such gas also is caused to expand in second plenum housings 31 and 32.

The structural members 170 and 171, respectively, extending between plenum housings 22 and 31, and between plenum housings 23 and 32, respectively, and wherein the respective port pluralities 26 and 27 are defined, interlocks transversely the walls of first plenum housing 22 with those of second plenum housing 31 and the walls of first plenum housing 23 with those of second plenum housing 32. The respective structural members 170 and 171 are preferably so positioned relative to nozzle portions 40 and 41 that, in combination with the walls of the respective plenum chambers 31 and 32, thermal expansion movements of such nozzle portions 40 and 41 width-wise is substantially prevented, thereby overcoming the so-called banana effect.

Tube 34 is equipped with a variable valve 46, tube 35 is equipped with a variable valve 47, tube 37 is equipped with a variable valve 48, tube 38 is equipped with a variable valve 49, all of which are so adjusted and controlled during operation of the aparatus 19 as to equalize the total volume of gas at a predetermined pressure entering the plenum housings 22 and 23 from the tubes 37 and 38, so that a substantially equal total volume of air is emitted during operation of the apparatus 19 from each of the nozzle portions 40 and 41. Any convenient tube and valve arrangement may be used. The position where, and manner in which, tubes 37 and 38 interconnect with each plenum housing 22 and 23 (with or without distributor conduits 141 and 142) is preferably such that a heated, pressurized gas entering a housing 22 or 23 does not pass through plenums 22 and 31, and plenums 23 and 32, before passing through nozzle portions 40 and 41 without undergoing the desired depressurization and equalization in such plenum housing pairs 22 and 31, and 23 and 32, respectively. Automatic control means may be employed if desired.

In addition, the apparatus 19 further includes a conventional temperature control means, including a thermostat means, or the like, (not shown) which is functionally mounted to measure and control the temperature of gas entering each of the plenum housings 22 and 23 from tubes 37 and 38 so that gas so charged into each one of the plenum housings 22 and 23 from the tubes 37 and 38, respectively, is at approximately the same predetermined temperature as it enters each of the plenum housings 22 and 23, respectively.

In the apparatus 19, the relationship between the input ports 24 and 25 and the respective associated plenum housings 22 and 23, is such that gas entering each plenum housing 22 and 23 (whether or not the distribution conduits 141 and 142 are employed) expands in such respective plenum housings 22 and 23. The total gas pressure at the input ports 24 and 25 is reduced in the respective plenum housings 22 and 23. Preferably, when distributor conduits 141 and 142 are used only one tube 37 and 38 is used to supply heated, pressurized gas to such individual distribution conduits 141 and 142. In table 1 is shown one presently preferred set of pressure ranges for apparatus 19.

When the apparatus 19 of the present invention is in an operative configuration, each one of the first plenum housings 22 and 23, and its respective associated second plenum housings 31 and 32, is so located spatially in relation to a elongated die body 50 that the nozzle portions 40 and 41 are located one in either side of the forward end or nose 51 of a die body 50 with the nozzle portions 40 and 41 being in generally opposed relationship to each other so that such nozzle portions 40 and 41 are adapted to supply during operation of the apparatus 19 a desired pair of angularly colliding gas streams of substantially matching, uniform properties, one nozzle portion 40 and 41 being on either side of the forward end 51 of die body 50 from which a plurality of aligned strands of hot melt issue during operation with the gas streams colliding about these strands. Each nozzle portion 40 and 41 is preferably equally distant from the strands during apparatus operation, but at a complementary angle with respect to each other.

Although gas temperatures and pressures can vary widely, depending upon material being stranded, process conditions, product desired, and many other variables, typical gas temperatures in a tube 37 or 38 range from about 550° to 750°F. while typical gas pressures in a tube 37 or 38 range from about 5 psig to 30 psig.

Gas temperature at the respective exits of nozzle portions 40 and 41 are generally less than the temperatures of gas supplied to distributor conduits 141 and 142 due to inherent expansion cooling; typical temperatures at respective nozzle portions 40 and 41 range from about 400° to 520°F. Pressures at the respective exits of nozzle portions 40 and 41 are substantially atmospheric, but pressures at the respective entrances to nozzle portions 40 and 41 are only slightly below gas supply pressures and typically range from about 4.8 psig to 29.5 psig.

The width of a gas stream issuing from a nozzle portion 40 or 41 typically ranges from about .003 to .030 inch with the length thereof being dependent upon the length of the plenum housing 22 or 23, which in turn is chosen so as to be about the length of a die body 50. Gas streams lengths can vary widely, being typically influenced by the length of a die body 50, as those skilled in the art will appreciate. Gas stream width is preferably constant along the length thereof. Gas issuing from a nozzle portion 40 or 41 is typically moving at a velocity of from about 400 to 1650 feet/second, in accordance with process variables desired in the art of producing melt blown microfibers, specific velocities being chosen for specific melt blowing operations, the upper limit being sonic velocity which varies with temperature. The apparatus is preferably so arranged that a gas stream is as near to a row of strands as practical at the position where the stream leaves a nozzle portion 40 or 41; typically spacing between sides of strands and commencement of a gas stream range from about 0 to .025 inch, as those skilled in the art will appreciate.

As those skilled in the art will also appreciate, it is conventional to employ, in apparatus for generating melt blown microfibers, a moving surface, such as shown by the dotted line 33 in FIG. 1, against which the melt blown microfibers impinge and form a web. Also, it is sometimes convenient to employ in such a process a source of secondary gas (usually air) which gas is at pressures usually only slightly above atmospheric and which is usually at ambient tempertures. Such secondary gas stream is provided by appropriate conduits 78 and 79 (see FIG. 1) located on outer sides, respectively, of the nozzle portions 40 and 41. The secondary gas facilitates air

TABLE I

| Value | Supply Pressure (psia)(1) | Gas Pressures Pressure drop through each distribution conduit (psia)(2) | Pressure after passing through distribution conduit (psia)(3) | Pressure Ratios Plenum/ distributor(4) | atmospheric/ distributor(5) |
|---|---|---|---|---|---|
| minimum value | 20 | 0.2 | 19.8 | 0.99 | 0.735 |
| maximum | | | | | |

TABLE I-continued

| Value | Supply Pressure (psia)(1) | Gas Pressures Pressure drop through each distribution conduit (psia)(2) | Pressure after passing through distribution conduit (psia)(3) | Pressure Ratios Plenum/ distributor(4) | atmospheric/ distributor(5) |
|---|---|---|---|---|---|
| value | 45 | 0.5 | 44.5 | 0.99 | 0.326 |

*Table I footnotes
(1) Supply pressure taken as pressure in each distribution conduit 141, 142, respectively.
(2) Pressure drop through each distribution conduit 141 and 142 measured by subtracting pressure in respective housings 22 and 23 from pressure in each respective distribution conduit 141 and 142.
(3) Pressure after passing through distribution conduits taken as pressure in respective housings 22 and 23.
(4) Pressure ratio of plenum to distributor taken as ratio of pressure in each housing 22 and 23 to respective pressure in each distribution conduit 141 and 142 (see footnotes (1) and (3) above).
(5) Pressure ratio of atmospheric to distributor taken as ratio of atmospheric pressure at time of operating apparatus 19 to respective pressure in each distribution conduit 141 and 142; this ratio may be regarded as significant to optimized operation of apparatus 19.

flow from the nozzles 40 and 41 and is particularly advantageous when a plurality of die bodies 50 are employed in a single melt blown microfiber production operation. Such a moving surface 33 and such a secondary air supply, are systems which are not a part of the present invention and are known to the prior art.

The apparatus 19 of this invention may be adapted for use with a plurality of die bodies 50, each such die body 50 being equipped with its own apparatus 19 or equivalent. Observe that the tube 35 may interconnect with a plurality of tube Y-joints 36 so that a plurality of apparatus 19 units can be used with but single compressor 20 and a single furnace 21, as those skilled in the art will appreciate.

Figure 2:
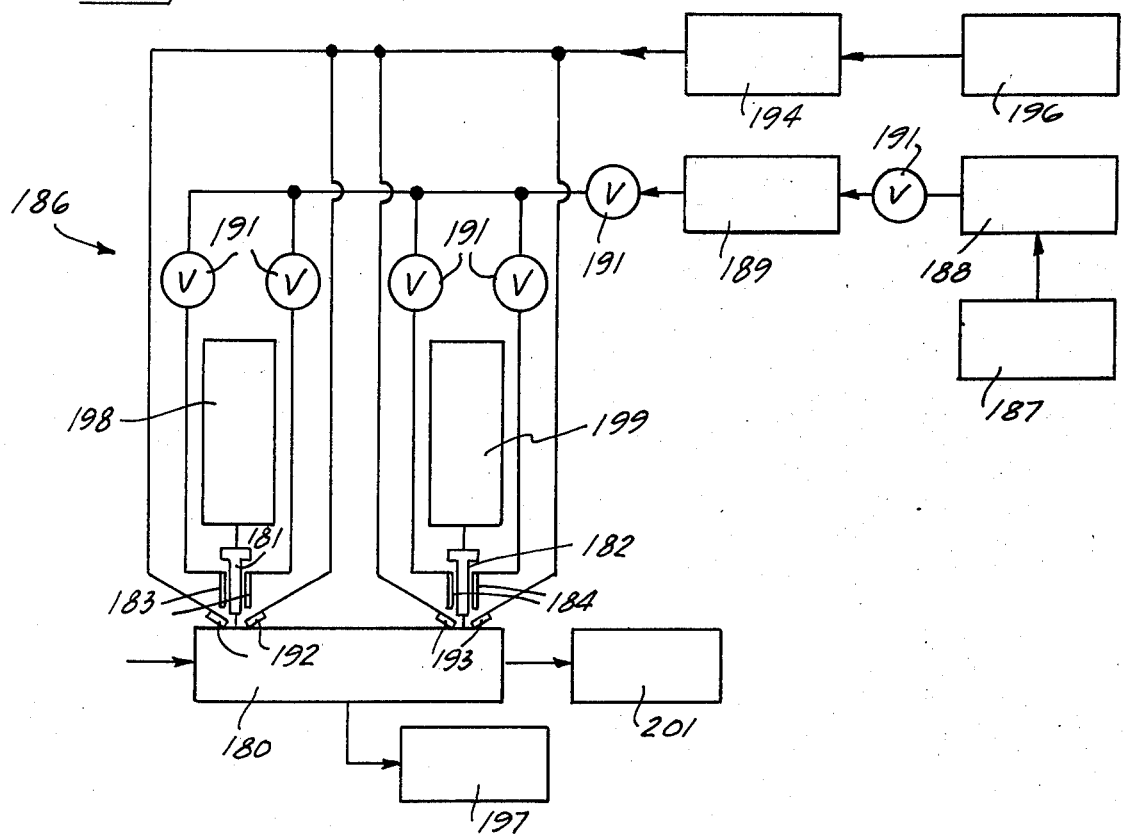
FIG. 2 is a schematic representation of another embodiment of operative principles of the present invention.

Referring to FIG. 2, there is seen in block diagrammatic form an embodiment of a melt blowing system 186 incorporating equipment of this invention as described above in reference to FIG. 1. Here, upon an endless open-meshed screen of a collector 180 moves continuously transversely beneath a pair of spaced, generally parallel die bodies 181 and 182, each of which may be similar to die body 50 of apparatus 19. Each of the die bodies 181 and 182 extrudes a row of strands. Each such row is melt blown with a paired plenum chamber arrangement 183 and 184. Each paired plenum chamber arrangement 183 and 184 is of the type of apparatus 19. The resulting blown microfibers are each laid down as a web on the screen of collector 180, one web being superimposed upon the other sequentially as the moving screen advances. The gas (here air) supplying the paired plenum chamber arrangements 183 and 184 is termed the primary air.

Primary air is here filtered by a filter 187, compressed by a compressor 188, and then heated by a furnace 189 suitable ducts interconnect such together and convey the heated, compressed, primary air to each of the respective paired plenum arrangements 183 and 184, valves 191 and suitable temperature regulating means (not shown) being used to regulate gas pressure and temperature in system 186 so as to supply the desired uniform air streams to each of the paired plenum arrangements 183 and 184. A typical set of conditions for the heated compressed primary air output directly from furnace 189 is a temperature of about 700°F., a pressure of about 30 psig, and a flow rate of about 270 ft³/min/ft of die width. Typical condition ranges at the respective nozzles of each of the paired plenum arrangements 183 and 184 are as indicated above.

The system 186 employs a supply of secondary gas (here air) which is blown into the region of melt blown microfibers from each of the die bodies 181 and 182, respectively. One pair 192 of secondary air ducts is located on either opposite outside of paired plenum chamber arrangement 183 and another pair of secondary air ducts 193 is located on either opposite outside of paired plenum chamber arrangement 184. Each such pair of ducts 192 and 193 is interconnected with apropriate tubes to a blower 194. Air drawn into blower 194 is filtered by a filter 196. A typical set of conditions for the secondary air output directly from blower 194 is a flow rate of about 2800 ft³/min/foot of die at ambient temperatures and at a pressure of about 7.5 inches H₂O. Each one of the secondary air ducts 192 and each one of the secondary air ducts 193 delivers about 1400 ft³/min/foot of die in the systems 186.

An exhaust blower 197 draws air from the underside of the screen of collector 180. A typical exhaustion rate is about 3400 ft³/min/foot of die at a negative pressure of about 8.0 inch H₂O.

Hot melt is fed to each die body 181 and 182 from an extruder 198 and 199, respectively, associated therewith. The composite, two-layered (laminated) web laid down on the screen of collector 180 is continuously removed and wound convolutely on a winder 201. If desired, various finishing operations, such as calendering or the like, can precede winder 201, as those skilled in the art will appreciate.

Figure 5:
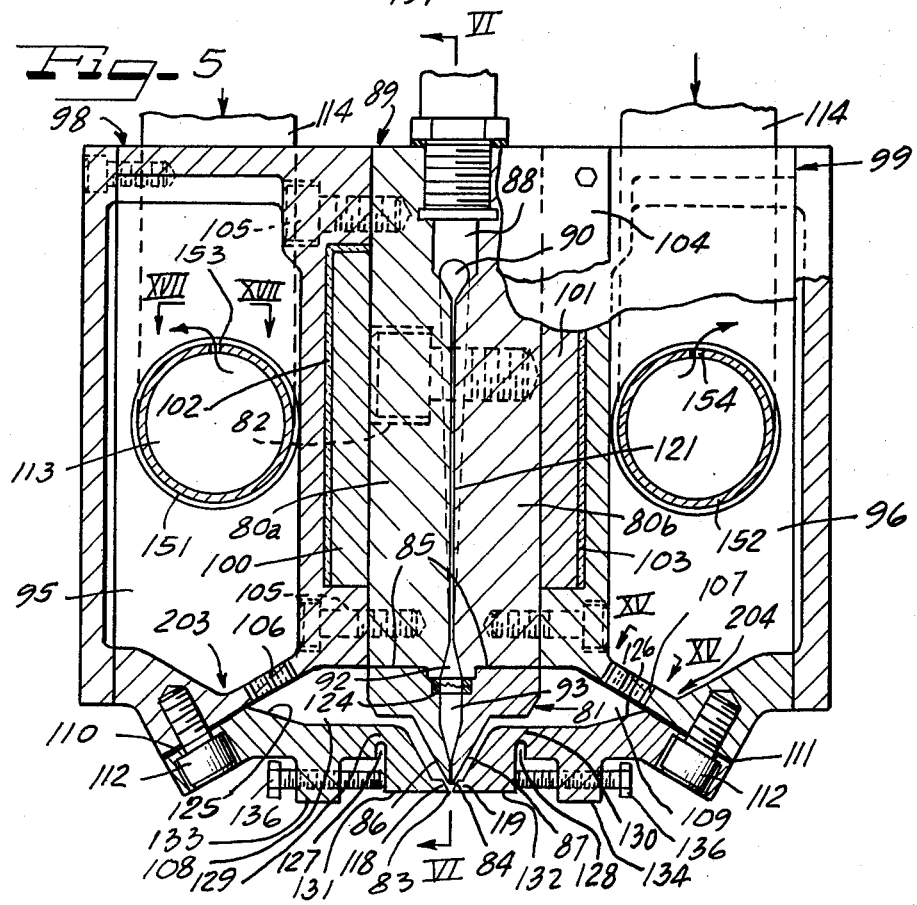
FIG. 5 is a vertical, sectional view showing another embodiment of apparatus of the present invention, some parts thereof shown in section, and some parts thereof broken away.

Referring to FIG. 3, there is seen an end elevational view of an embodiment of two pairs of distribution conduit equipped plenum chambers and associated elements incorporating the teachings of the present invention. Thus, a pair of first plenum housings 53 and 54 are positioned in spaced, generally parallel relationship to each other in symmetrical fashion, one on either side of a die body 55. The internal structure of die body 55 is not part of this invention, but can be as desired for use in melt blowing microfibers, as those skilled in the art will appreciate; for illustration herein, die body 55 may have a structure as described hereinafter for die body assembly 89 as shown in FIG. 5. Plenum housings 53 and 54 have centrally located in an opposite end wall of each an input port 56 and 57 (not detailed). A plurality of longitudinally extending output ports 58 and 59, respectively, are defined in a side wall portion of each plenum housing 53 and 54.

Mounted longitudinally in the interior of each plenum housing 53 and 54 in generally spaced relationship to the side walls thereof and extending from the respective input ports 56 and 57 to the opposite end wall of each plenum housing 53 and 54 is a distribution conduit 146 and 147, respectively, which is an optional but preferred feature of this embodiment. Each conduit 146 and 147 is open at input ports 56 and 57 and each conduit 146 and 147 at such ports 56 and 57 is in generally sealed engagement with the adjacent wall of each plenum housing 53 and 54, respectively, as by means of welding, or the like. The opposite end of each such conduit 146 and 147 is closed and is engaged with the adjacent, opposite end wall of each plenum housing 53 and 54. Each respective conduit 146 and 147 has a plurality of apertures 148 and 149 defined therein in side walls thereof. In the embodiment shown, these aperture pluralities 148 and 149 are generally axially aligned with their respective conduits 146 and 147 and are positioned on the upper or top side of each such conduit 146 and 147; in case foreign non-gaseous bodies enter the conduits 146 and 147; the aperture pluralities 148 and 149 tend not to be plugged therewith.

A pair of elongated, preferably cross-sectionally funnel shaped second plenum housings 63 and 64 are provided, each such second plenum housing 63 and 64 having a width which is longitudinally elongated and further having a longitudinally elongated, transversely enlarged input mouth portion which is interconnected about the output ports 58 and 59 of a different one of each plenum housing 53 and 54, respectively. In addition, each second plenum housing 63 and 64 has a terminal, longitudinally elongated slotted nozzle portion 65 and 66. The nozzles 65 and 66 are in generally equally spaced, generally parallel, generally symmetrical relationship to each other such that, cross-sectionally, the complementary respective angles of inclination of opposed center portions of each one of the nozzle portions 65 and 66 range from between about 0° to 90° with respect to the center midway between such nozzle portions 65 and 66, all as earlier above indicated in reference to FIG. 1. The longitudinally elongated chamber portion in each housing 63 and 64 about each of ports 58 and 59, respectively provides an expansion zone or region into which heated, compression gas from ports 58 and 59 expands. The nozzles 65 and 66 are located in the side of each housing 63 and 64 which is about opposite that of ports 58 and 59, respectively.

The structural members 60 and 61 (here such members can be considered to have been sections derived from the circumferentially extending side walls of first plenum housings 53 and 54) within which the port pluralities 58 and 59 are defined, respectively, substantially prevent transverse expansive and contractive movements of the walls of second plenum housings 63 and 64 during operation of such apparatus, as desired, in order to overcome the banana effect and at the same time produce uniform gas distribution before emergence of gas from nozzles 65 and 66, respectively.

In order to provide heated, pressurized gas for each of the plenum housings 53 and 54, a tube 67 and 68 is connected with each input port 56 and 57 respective plenum housing 53 and 54, each tube 67 and 68 being adapted to carry heated, compressed gas in, for example, the manner above indicated in reference to FIG. 1, although any convenient arrangement may be employed to supply compressed, heated gas to the apparatus shown in FIGS. 2 and 3, as those skilled in the art will appreciate.

Although the plenum housings 53 and 54 are tubular and thus circular in cross-section, those skilled in the art will appreciate that other cross-sectional configurations for plenum housings 53 and 54 may be employed. Thus, such plenum housings 53 and 54, respectively, may each have tapered side wall portions proceeding from one end to the other thereof and the cross-section may be non-circular. Similarly, the conduits 146 and 147 may be tapered and have non-circular cross-sections. The apertures 148 and 149 may be of any convenient size or shape. The housings 53 and 54, the conduits 146 and 147, and the aperture pluralities 148 and 149 preferably cooperate to cause gas pressure and temperature at output nozzles 65 and 66 to be substantially equal, based upon constant gas streams at constant temperatures entering through the tubes 67 and 68.

Figure 14:
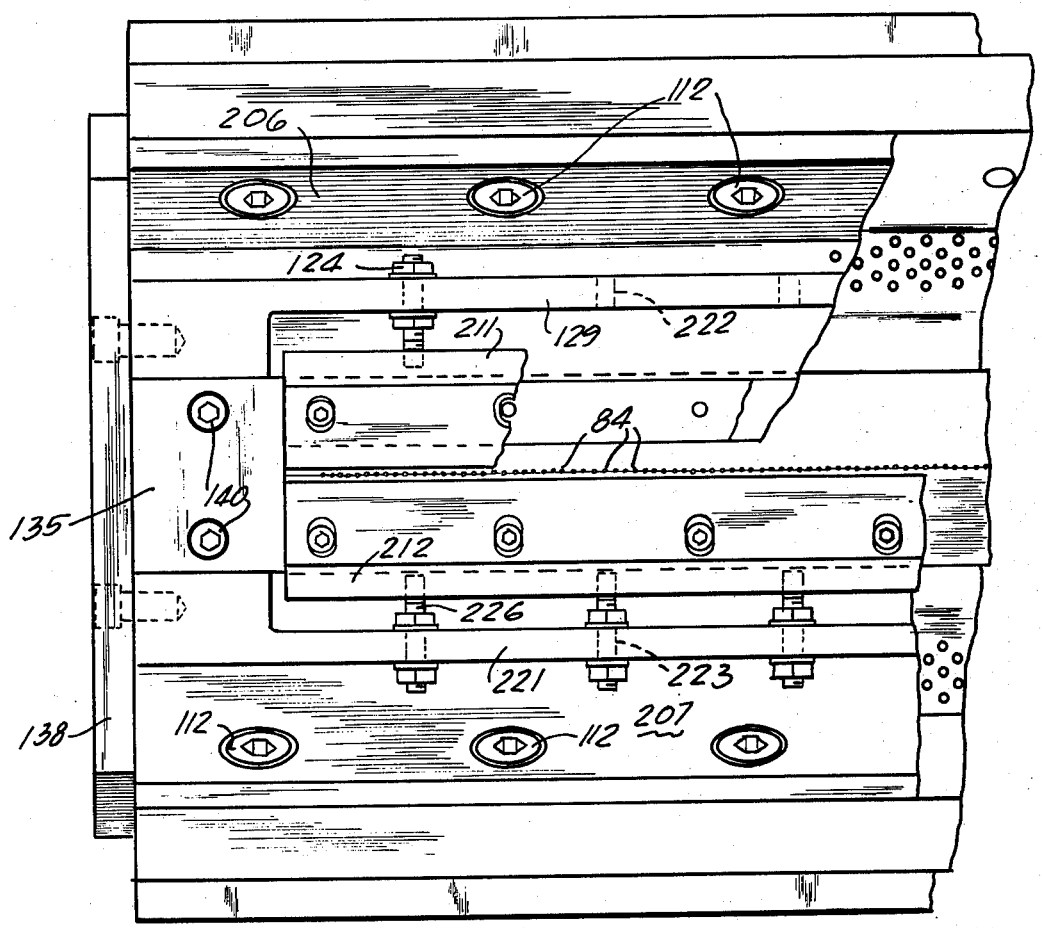
FIG. 14 is a bottom plan view of the embodiment shown in FIGS. 12 and 13.

In FIG. 5 is seen a preferred embodiment of a distribution conduit equipped plenum chamber system of the present invention. Here, a die assembly 89 has a die body formed of a pair of mating halves designated as 80A and 80B and a die nose 81. The die nose 81 is mounted by its enlarged base 85 against the forward face of the die body 80A/80B by appropriate bolts (not shown). The respective halves 80A and 80B are secured together by means of bolts 82. The die nose 81 has a forwardly located elongated narrow planar face 83. A plurality of orifices 84 (see FIG. 14) are defined in the face 83 and are adapted for simultaneous extrusion therefrom of a plurality of spaced, aligned, parallel strands (not shown) of a hot melt of plastic material, or the like, during operation of such apparatus. On either exterior side of the face 83 and adjoining same is a pair of forwardly tapered, planar, opposed side walls 86 and 87 which extend back to the base 85.

The assembled die body mating halves 80A and 80B are equipped centrally with a rearwardly opening melt input port 88 leading into the interior thereof. The interior of die body 80A/80B is adapted to distribute therewithin a melt entering the input port 88 so that when the melt reaches the orifices 84 and exits therefrom, the melt is uniformly distributed and evenly extrudes uniformly from such orifices 84. To achieve such melt distribution within the die body 80A/80B, the opposed, engaging surface portions of the respective die body halves 80A and 80B are so machined that when such halves 80A and 80B are brought together into mating engagement (see FIGS. 5 and 6), there is defined therebetween a pair of diverging main channels 90 and 91. These channels 90 and 91 extend in generally opposed directions away from the melt port 88 with which they commence. Each of these channels 90 and 91 is tapered along the length thereof, as shown by FIGS. 7 through 10, opens on its forward (or bottom) side into channels 121 and 122, respectively, so as to permit a hot melt to move continuously from each channel 90 or 91 downwardly or forwardly towards a longitudinally extending chamber region 92 formed in die body 80A/80B adjacent the forward face thereof where the rear face of the die nose 81 abuts.

Figure 11:
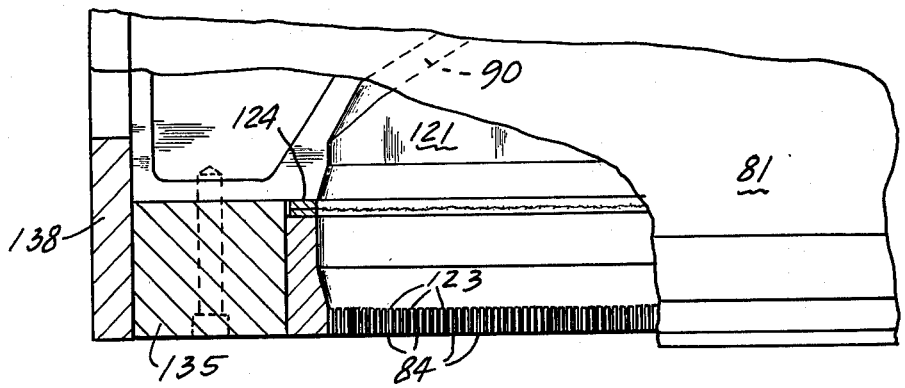
FIG. 11 is an enlarged, fragmentary side elevational view of one end of the die body shown in the embodiment of FIG. 5, some parts thereof broken away, and some parts thereof shown in section.

Formed in the die nose 81 is a mating longitudinally extending chamber 93. The forward portion of the chamber 93 is tapered and interconnects forwardly with the individual channels 123 terminating in the orifices 84 in the forward face 83 of the die nose 81. The overall arrangement of the channels 90 and 91, channels 121 and 122, chamber 92, chamber 93, and channels 123 (see FIG. 11) is conventional and is known to those skilled in the art as a "coat-hanger" or "Modified coat hanger" type of melt distribution system. Any conventional distribution arrangement may be used for distributing a hot melt within a die assembly 89 for purposes of the present invention. It is preferred to manufacture a die assembly 89 of metal which has been machined to close tolerances so that metal to metal seals between the die body halves 80A and 80B, and between such halves 80A and 80B and die nose 81, may be employed as seen in FIG. 5 without necessity to employ independent sealing means as is conventional in die manufacture.

On each side of the die assembly 89 is positioned an elongated first plenum chamber 95 and 96. Each such plenum chamber 95 and 96 is defined by the walls of a plenum housing 98 and 99, respectively. Each plenum housing 98 and 99 has its top wall portions, bottom wall portions and end wall portions integrally formed with its respective inside wall portions. The outside wall of each plenum housing 98 and 99 is formed by a separate plate member which is secured to such top, bottom and end wall portions by any convenient means, here by bolts (not shown) threadably received within the edge portions of such top, bottom, and end wall members and passing through the perimeter edges of such respective outside walls.

Between the outside walls of the die body 80A/80B and the adjacent inside walls of the plenum housings 98 and 99, a recess is formed within which is accomodated heater memebers 100 and 101, respectively, of a conventional electric resistance coil, or the like, the heaters 100 and 101 preferably being mounted against the die body 80A and 80B. These heaters 100 and 101 aid an operator in maintaining a substantially uniform temperature within the die body 80A/80B. Such heaters 100 and 101 also help maintain the wall of the plenum chambers 95 and 96 at a uniform temperature which better enables one to control the uniformity of the temperature of gas being processed in accordance with the teachings of the present invention. Optionally, as shown in FIG.5, layers 102 and 103 of insulation is provided between the respective heaters 100 and 101 and the adjacent inside walls of the plenum housings 98 and 99, respectively. These insulation layers 102 and 103 tend to prevent rapid changes in the temperature of the system, such as might occur, for example, through a sudden alteration of gas temperature within the plenum chambers 95 and 96, as during a start-up, shut down, or process change-over of apparatus embodying this invention.

Optionally and preferably, a screen member 124 is mounted transversely across the mouth of the chamber 93 to prevent any foreign solid bodies within a polymer hot melt from entering the forward portion of the die nose 81 and possibly plugging channels 123.

To rigidify the assembly, a pair of face plates 104 is mounted one over each opposed end of die assembly 89 and the adjacent ends of the plenum housings 98 and 99. The face plates 104 are secured to the respective end walls of the plenum housings 98 and 99 by means of bolts, or the like, matingly received within appropriate threaded sockets formed in the respective end walls of the plenum housings 98 and 99. Between the bottom wall and the inside wall of each plenum housing 98 and 99 extends a plate 203 and 204, respectively, within each of which a plurality of apertures or ports 106 and 107 are respectively defined. Each plate 203 and 204 is so shaped and oriented that the port pluralities 106 and 107 are inclined at complementary angles with respect to one another in spaced, symmetrical relationship. These output ports 106 and 107 extend over approximately the entire longitudinal length of each plenum housing 98 and 99, respectively. Plates 203 and 204 may be integrally formed (as shown) with housing bottom wall members, or may be separately formed and then mounted in place, as those skilled in the art will appreciate.

A pair of second plenum chambers 108 and 109, each one preferably cross-sectionally funnel shaped, as shown, are provided on the down-stream side about each output port plurality 106 and 107, respectively. Each plenum chamber 108 and 109 extends between respective output port pluralities 106 and 107 and nozzles 118 and 119 on either side of face 83 of die nose 81. Each plenum chamber 108 and 109 is defined by a combination of wall portions of the respective plenum housings 98 and 99, the respective side walls 86 and 87 of the die nose 81, and by a pair of cap plates or bottom plates 125 and 126, respectively. Each cap plate 125 and 126 is secured to a different bottom wall of respective first plenum housings 98 and 99 adjacent the respective plates 203 and 204 thereof by means of bolts 112 threadably received within appropriate sockets formed in the plenum housing bottom walls 98 and 99. The cap plates 125 and 126 cooperate with the side walls 86 and 87 of die nose 81 to define the desired nozzles 118 and 119 respectively adjacent the die face 83 whereby a desired pair of angularly colliding elongated gas streams may be generated in accordance with the teachings of the present invention. As those skilled in the art will appreciate, the internal surface configuration of the cap plates 125 and 126, particularly in the region of the side walls 86 and 87 of the die nose 81, can be adjusted or chosen for optimum operating efficiency in a given apparatus embodiment.

Each plenum housing 98 and 99 has an input port, such as port 113 (see FIG. 6). To each such input port 113 is joined a tube, such as tube 114, by fastening means such as bolts 116 extending through a flange 115 thereof into end walls of a plenum housing, such as housing 99. These tubes, such as tube 114, connect with, in turn, other tubes (not shown) to complete the air supply system for this assembly, which may be conventional.

Extending longitudinally through the interior of each plenum chamber 95 and 96 in generally spaced relationship to the inside walls thereof from the respective input ports 113 to the opposite end wall of each plenum housing 98 and 99 is a distribution conduit 151 and 152, respectively. Each such conduit 151 and 152 is open at the end thereof joining each output port 113 and is in generally sealed engagement therewith; the opposite end of each such conduit 151 and 152 being in sealing engagement (using a cap 150 and bolts 116; see FIG. 6) with such opposite end wall of each plenum housing 98 and 99. Each respective such conduit 151 and 152 has a plurality of apertures 153 and 154 defined thereon in side wall portions. The shape and location of such aperture means in each conduit 151 and 152 as well as the cross-sectional configuration of each such conduit 151 and 152, is such that a pressurized gas fed into each input port 113, is emitted from each conduit 151 and 152 generally uniformly and generally continuously along the length thereof in each respective plenum chamber 95 and 96. Air flow from each conduit 151 and 152 into plenum chambers 95 and 96, respectively, is indicated by the arrows in FIG. 5.

Although not necessary for the present invention, it is preferred to employ, for convenience reasons in a given apparatus, means for adjusting the size and position of gas stream orifices in relation to their respective relative positions adjacent die nose 81. For example, in the embodiment shown in FIG. 5, some adjustability is provided for the nozzles 118 and 119, respectively, defined by the cap plates 125 and 126 in relation to the die nose 81, by the cap plates 125 and 126 themselves, since the plurality of bolts 112 employed provides a measure of adjustability for regulating the size of the orifices 118 and 119, respectively, along the slotted length thereof. Shims 110 and 111 may be provided between adjacent surfaces of the cap plates 125 and 126, respectively, and the adjoining surfaces of the plenum housings 98 and 99. Adjustability of orifice dimensions is convenient because it has been found that it is possible for a given nozzle 118 and 119 to expand in its mid-section along a die face 83 during operation, owing to thermal changes occurring in respective plenum housings 98 and 99 which is an undesirable effect as indicated. One way of compensating for such expansion is to preset the gaps for nozzles 118 and 119 in the mid-section along die face 83 before a start-up so that, after the apparatus has reached a desired operating temperature, the nozzles 118 and 119 have, in their heated and expanded condition, the desired dimensions in their respective mid-sections.

An additional arrangement permitting the regulating of dimensions of the nozzles 118 and 119 is shown associated with the cap plates 125 and 126 illustrated in FIG. 5. Here, cap plates 125 and 126 each are equipped with adjustment means. The adjustment means includes a slot 127 and 128, respectively, longitudinally formed in the outside face of each cap plate 125 and 126, the depth of the slots 127 and 128 being chosen so as to provide a pivotal, yieldingly biased, arcuate movement in the region 129 and 130 of cap plates 125 and 126 adjacent the slots 127 and 128 when leverage is applied by bolts against terminal bodies 131 and 132, respectively, of cap plates 125 and 126 adjacent the die nose 81 so that the size of the orifices 118 and 119 is controlled. Adjustment bolts 136 are mounted in threaded bores transversely formed in longitudinally extending ridges 133 and 134 formed on the outside walls of respective cap plates 125 and 126, there being a plurality of longitudinally spaced adjustment bolts 136 transversely mounted through each ridge 133 and 134.

Figure 12:
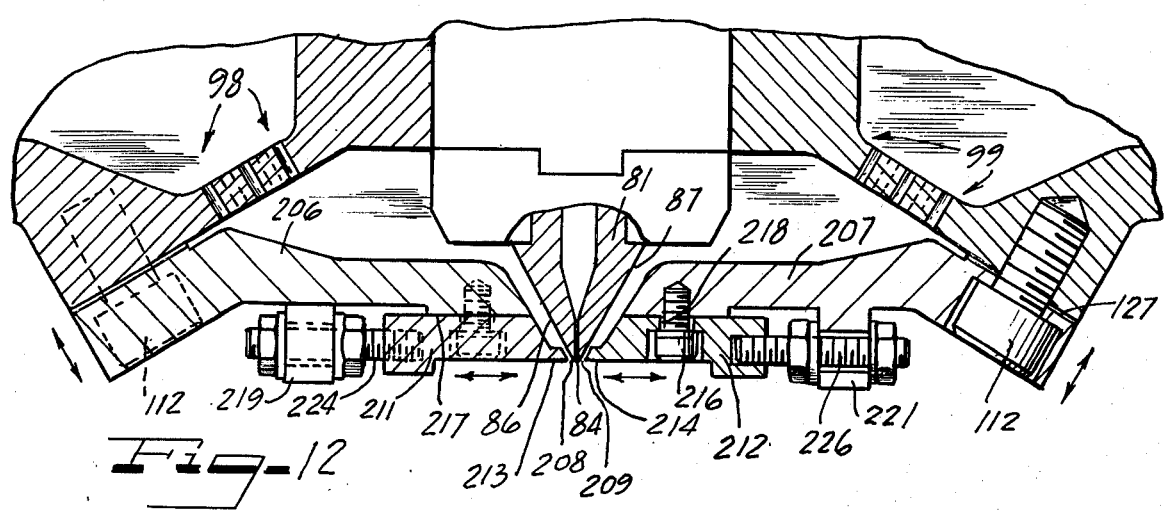
FIG. 12 is a vertical, sectional, fragmentary, enlarged, detail view taken through the orifice region of the embodiment shown in FIG. 5 illustrating an alternative embodiment of the present invention, some parts thereof shown in section.

Referring to FIG. 12, there is seen an assembly similar to that shown in FIG. 5, but employing, as an alternative embodiment, a pair of cap plates 206 and 207, each cap plate being similarly mounted to cap plates 125 and 126 in FIG. 5, through the use of bolts 112 to respective fires plenum housings 98 and 99. The cap plates 206 and 207 cooperate with the side walls 86 and 87 of the die nose 81 to define the desired nozzles 208 and 209, respectively, adjacent the die face 83 to generate a desired pair of angularly colliding elongated gas streams. The internal configuration of the cap plates 206 and 207 can be adjusted or chosen as desired in a given apparatus embodiment.

Each cap plate assembly 206 and 207 includes a nozzle spacing adjustment means. Such adjustment means incorporates a pair of flange plates 211 and 212, respectively, one such flange plate 211 or 212 being associated with each such cap plate 206 or 207 at a raised or projecting outer edge portion 213 and 214, respectively, of each of the cap plates 206 and 207, respectively. Each flange plate 211 and 212 is held against such respective raised outer edge portions 213 and 214, respectively, by means of bolts 216 normally extending through the respective flange plates 211 and 212 and into engagement with an appropriately formed threaded socket extending into each of the raised or projecting outer edge portions 213 and 214, respectively. For purposes of permitting adjustment of the flange plates 211 and 212 relative to raised outer edged portions 213 and 214, the aperture 217 and 218 formed in each flange plate 211 and 212 through which the bolts 216 extend are elongated so as to permit the flange plates 211 and 212 to slidably move over the raised outer edge portions 213 and 214, respectively, when the bolts 216 are loosened so that the plates 211 and 212 may move towards and away from the side walls 86 and 87 of die nose 81.

Figure 13:
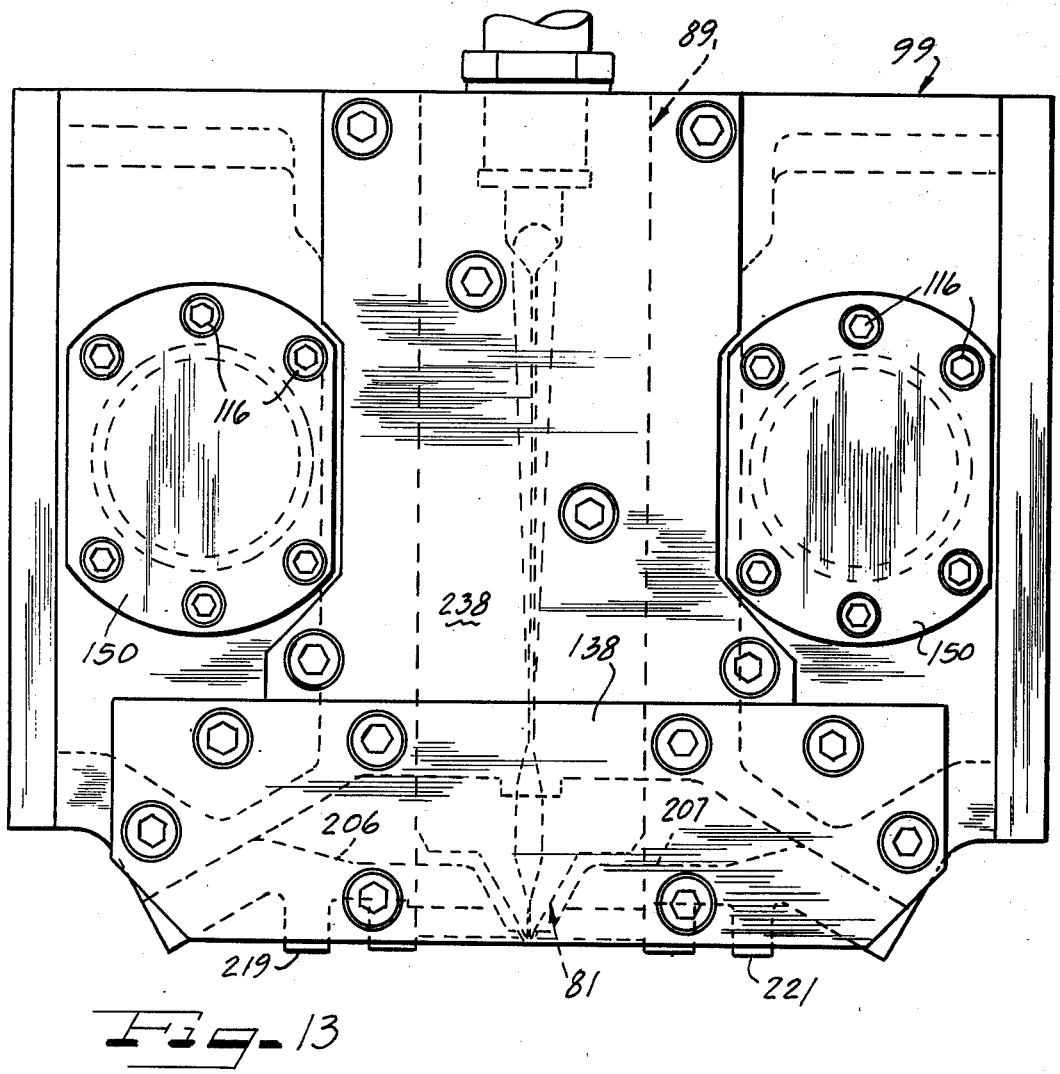
FIG. 13 is an end elevational view of the embodiment shown in FIG. 12.

On the outside bottom face of each cap plate 206 and 207 in spaced relationship to the raised outer edge portions 213 and 214, respectively, and integrally formed with the cap plates 206 and 207, are ridges 219 and 221. Transversely extending through each ridge 219 and 221 in longitudinally spaced relationship to one another are a plurality of apertures 222 and 223 (see FIG. 14), respectively, through which a plurality of spacer bolts 224 and 226, respectively, extend. Each spacer bolt 224 or 226 is clamped to its associated ridge member 219 or 221, as the case may be, by appropriate bolt and washer assemblies. The forward end of each spacer bolt 224 and 226 is brought into engagement with a socket positioned and formed in the outside edge wall portion of each flange plate 211 and 212, respectively. Adjustment of the position of the spacer bolts 224 and 226 when the bolts 216 are loosened permits precise location of the flange plates 211 and 212 relative to cap plate 206 and 207 after which the bolts 216 are tightened and the position of the spacer bolts 224 and 226 fix by means of their respective associated nut assemblies. Shims 227 may be positioned between the plenum housings 98 and 99 and cap plates 206 and 207 in the region through which the bolts 112 extend. The embodiment of FIG. 5 equipped with the adjustment means illustrated in FIGS. 12, 13, and 14 constitutes a presently more preferred form of the present invention.

The appearance of the apertures of ports 106 and 107 is illustrated in FIG. 15 where the plate 204 is illustrated, the ports 107 being substantially identical to those ports 106. The ports 106 and 107 are generally uniformly spaced in the plates 203 and 204 so as to provide the capability for uniform air distribution for a gas passing through these respective port pluralities 106 and 107. Any convenient arrangement may be employed for these ports. For example, in FIG. 16 an alternative embodiment is shown wherein the ports 107 of the plate 204 have been changed to eliptically shaped ports 231 in a plate 232.

The distribution conduits, as indicated, are so constructed as to permit a gas to escape therefrom which is charged thereinto (as all described hereinabove) at a uniform rate relative to the length thereof. In the case of a tubular distribution conduit, such as conduit 151 in FIG. 17, the apertures 153 preferably have a varying size taken along the length of the conduit 151. Thus, in the region of the conduit 151, which is adjacent output port 113, the apertures 153 are small, but, as one proceeds down the length of the conduit 151, the apertures 153 are preferably enlarged, so that, in a region near the sealed end thereof, the apertures 153 have a maximum cross-sectional area as illustrated, for example, in FIG. 17. In place of using a cylindrically shaped conduit 151, one may employ a tapered conduit, such as conduit 234 of FIG. 18. In conduit 234, uniform distribution is achieved through the taper of the conduit, and in this case, the apertures 236 each have a uniform cross-sectional area. Any prechosen interrelationship between apertures 236 or conduits 234 which is convenient may be employed, so long as the uniform air distribution is achieved through the use thereof in a plenum chamber of the type employed in the present invention.

To encourage intermixing of air or gas escaping from a plenum chamber, such as plenum chamber 151 of FIG. 5, one may equip such distribution conduits with a deflector 155, as shown in FIG. 19. Deflector 155 adapts or causes air escaping from conduit 151 or 152 to be deflected and assume a curved path at least initially within a plenum housing 95. Preferably, both conduits 151 and 152 are equipped with such deflector assembly 155, thereby to enhance the mixing and blending of a gas in such plenum chambers 98 and 99.

To aid in maintaining the die nose 81, the plenum housings 98 and 99, and the cap plates 206 and 207 in fixed spatial relationship to one another, an embodiment of this invention which is integral with a die body's preferably incorporates a pair of die lip spacer blocks 135 (see FIG. 14), one at either end of die nose 81. Each spacer block 135 is held in place by means of bolts 140. Any convenient means, as those skilled in the art will appreciate, may be employed to achieve adjustment of nozzles employed in apparatus of the present invention.

The present invention is also directed to process for forming a pair of angularly colliding, highly elongated product gas streams of substantially uniform but equal characteristics. The process involves the step of charging a gas stream to an end region of each of a pair of generally matching elongated distribution zones, each such gas stream being initially at substantially the same temperature and pressure.

Next, one first releases said respective gas streams from respective side wall portions of each of said distribution zones at a generally uniform average rate relative to the respective lengths thereof. The so released gas passes into the interior of each of a pair of generally matching first elongated plenum zones. There is a different one of such first plenum zones for each of said distribution zones. Each of said gas streams undergoes in each such first plenum zones a similar pressure drop. This pressure drop is, for example, in each case such that the ratio of the gas pressure at the commencement of each respective distribution zone to the average gas pressure in each of the associated respective first plenum zones ranges from about 1.0 : 0.99.

Next, one secondly releases said respective gas streams from each of said first plenum zones into the interior of each of a pair of generally matching second elongated plenum zones from respective side wall portions of each of said first plenum zones at a generally uniform average rate relative to the respective lengths thereof. There is a different one of such second plenum zones for each of said first plenum zones. Each of said gas streams undergoes a similar pressure drop in each of said second plenum zones such that the ratio of the average gas pressure in each of said first plenum zones to the average gas pressure in each of the associated respective second plenum zones falls in the range from about 0.99 : 0.735 to 0.99 : 0.326.

Finally, one releases said respective gas streams from each of said second plenum zones through a continuous, highly elongated, matching nozzle zone defined in respective side wall portions of each of said second plenum zones. Each of said nozzle zones is adapted to produce a highly elongated gas stream whose width has a substantially constant value in the range from about 0.003 to 0.030 inch. These nozzle zones are in spaced parallel relationship to each other with each such nozzle being inclined towards the other at substantially the same relative complementary angle so that the center of each of such product gas streams issuing from such a nozzle is inclined at a similar angle in the range from about 0° to 45° with respect to the center therebetween.

Preferably, in such process, each of such first plenum zones envelops the sidewall portions of each of said distribution zones in generally spaced, parallel ralationship thereto and the volume of each of such first plenum zones is substantially greater than the volume of each associated respective said distribution zone.

Preferably in such process, the angle the center of each such product gas stream makes with respect to said center therebetween is substantially the same and has a substantially constant value in the range from about 15° to 45°.

Preferably in such process, the temperature of each such product gas stream is substantially the same and has a substantially constant temperature in the range from about 300° to 370°C. Preferably in such process, the pressure of each such product gas stream is substantially the same and has a substantially constant pressure in the range from about 5 to 30 psi. Preferably in such process, the flow rate of each such product gas stream is substantially the same and has a substantially constant value in the range from about 27 to 270 cubic feet/min/foot of nozzle zone.

Preferably in such process, in said first releasing, said pressure drop ratio is substantially the same for each of said gas streams and has a value in the range of about 1.0 : 0.99.

Preferably in such process in said second releasing, said pressure drop ratio is substantially the same for each of said gas streams and has a value in the range from about 0.99 : 0.735 to 0.99 : 0.326.

Usually, in such process, the gas is air. Typically in this process a plurality of spaced, aligned, hot melt strands each ranging in average diameter from about 0.008 to 0.022 inches are being extruded. Such strands have a distance between strand centers of from about 0.03 to 0.08 inches and are extruded into the zone of confluence formed by said pair of angularly colliding product gas streams along the center therebetween.

Other and further embodiments and variations of the present invention will become apparent to those skilled in the art from a reading of the present specification taken together with the drawings and no undue limitations are to be inferred or implied from the present disclosure.

The claims are:

1. Apparatus adapted for melt blown microfiber production comprising:

A. a pair of elongated distribution conduit means in spaced relationship to each other, each such distribution conduit means defining therewithin an elongated first plenum chamber and having first input port means defined therein and a plurality of first output port means defined in longitudinally extending wall portions thereof, B. a pair of elongated first plenum housing means in spaced relationship to each other, and to said pair of distribution conduit means, each one of said pair of first plenum housing being in a transversely spaced, adjacent, circumscribing associated relationship to a different one of each of said pair of distribution conduit means longitudinally therealong, each such first plenum housing means having second output port means defined in longitudinally extending wall portions thereof, and further having the opposed end regions thereof in fluid-tight engagement with the adjacent opposed end portions of the distribution conduit means so circumscribed thereby, each such so associated said distribution conduit and said first plenum housing means defining therebetween an elongated second plenum chamber, C. a pair of elongated second plenum housing means, each one longitudinally extending along, and being interconnected in fluid-tight engagement with, a different one of said first plenum housing means, with opposed, longitudinally extending wall portions of each said second plenum housing means terminating on its associated respective first plenum housing means in laterally spaced relationship to at least one side of said second output port means thereof each one of said second plenum housing means having a longitudinally elongated third plenum chamber defined therein and a longitudinally elongated output orifice defined therein, said second output port means communicating with said third plenum chamber, each one of said output orifices being in spaced, parallel relationship to the other thereof and oriented angularly so that cross sectionally the angle of inclination between respective center lines of said output orifices relative to each other ranges from about 90° to 180°, and an elongated separate die interposed in spaced relationship between said pair of output orifices, said die body —
1. having a forwardly located, elongated narrow planar die face,
2. having a pair of forwardly tapered, exterior, opposed side walls adjoining said die face,
3. having a plurality of die orifices defined in said die face and adapted for simultaneous extrusion therefrom of a plurality of spaced, aligned strands of a melt,
4. having a melt input port, and
5. being adapted to distribute therewithin generally uniformly a melt entering said input port and exiting from said orifice plurality, said die body being interposed between each of distribution conduit means and in spaced relationship to each one of said pair of elongated second plenum housing means, said first, second, and third plenum chambers coacting with said die body so that during operation of said apparatus, gas streams issuing from respective ones of said output port means define a pair of angularly colliding elongated gas streams such that the colliding occurs downstream in spaced relationship to said plurality of orifices.

2. The apparatus of claim 1 further including mounting means positioning each one of said plenum housing means in fixed spacial relationship to said die body.

3. The apparatus of claim 1 wherein the size relationships between component elements is such that the expansion ratio in each such second plenum chamber between gas pressures before entering such chamber and after entering such chamber is at least about 1.0 : 0.99.

4. The apparatus of claim 1 wherein the interrelationship between said second plenum chambers, said third plenum chambers, and said second output port means is such that the ratio of the average gas pressure in each of said second plenum chambers to the average gas pressure in each of the said respective associated third plenum zones falls in the range from about 0.99 : 0.735 to 0.99 : 0.326.

5. The apparatus of claim 1 wherein each of said output orifices has a substantially constant similar width ranging from about 0.003 to 0.03 inch.

6. The apparatus of claim 1 wherein each of said die orifices has a diameter of from about 0.008 to 0.022 inch and the distance between centers of said die orifices ranges from about 0.030 to 0.080 inch.

7. The apparatus of claim 3 wherein said expansion ratio ranges from about 0.99 : 0.735 to 0.99 : 0.326.

8. The apparatus of claim 1 further including gas supply means adapted to emit continuously a pressurized gas, and tube means interconnecting said gas supply means with each of said first input port means.

9. The apparatus of claim 8 further including heating means adapted to heat a pressurized gas stream to an elevated temperature and interconnecting said tube means between said gas supply means and each of said first input port means.

* * * * *